US005601788A

United States Patent [19]

Hyppänen et al.

[11] Patent Number: 5,601,788
[45] Date of Patent: *Feb. 11, 1997

[54] COMBINED CYCLE POWER PLANT WITH CIRCULATING FLUIDIZED BED REACTOR

[75] Inventors: Timo Hyppänen, Karhula; Juhani Isaksson, Kotka; Timo Eriksson; Teuvo Pulkkinen, both of Karhula, all of Finland; Steven J. Provol, San Diego, Calif.

[73] Assignee: Foster Wheeler Energia OY, Finland

[*] Notice: The term of this patent shall not extend beyond the expiration date of Pat. No. 5,341,766.

[21] Appl. No.: 427,094

[22] Filed: Apr. 21, 1995

Related U.S. Application Data

[63] Continuation-in-part of Ser. No. 164,888, Dec. 10, 1993, Pat. No. 5,460,788, which is a continuation-in-part of Ser. No. 953,297, Sep. 30, 1992, Pat. No. 5,281,398, which is a continuation of Ser. No. 765,450, Sep. 25, 1991, abandoned.

[51] Int. Cl.⁶ .................. F22B 1/00; F27B 15/08
[52] U.S. Cl. .................. 422/147; 422/146; 122/4 D; 110/216; 110/245; 165/104.16; 55/269; 55/345; 55/346; 55/459.1; 55/350.1
[58] Field of Search .................. 422/146, 147; 122/4 D; 165/104.16; 110/216, 245; 55/269, 302, 350.1, 459.1, 337, 345, 346

[56] References Cited

U.S. PATENT DOCUMENTS

| | | | |
|---|---|---|---|
| 4,699,068 | 10/1987 | Engstrom | 110/216 |
| 4,732,113 | 3/1988 | Engstrom | 110/216 |
| 4,793,292 | 12/1988 | Engstrom | 122/4 D |
| 4,865,627 | 9/1989 | Dewitz et al. | 55/302 |
| 4,869,207 | 9/1989 | Engstrom et al. | 122/4 D |
| 4,900,516 | 2/1990 | Engstrom et al. | 110/216 |
| 5,110,331 | 5/1992 | Williams | 55/302 |
| 5,114,581 | 5/1992 | Goldsmith et al. | 210/650 |
| 5,242,472 | 9/1993 | Sellakumar | 96/280 |
| 5,281,398 | 1/1994 | Hyppanen et al. | 422/147 |
| 5,293,843 | 3/1994 | Provol et al. | 422/146 |
| 5,341,766 | 8/1994 | Hyppanen | 422/146 |
| 5,460,788 | 10/1995 | Hyppanen et al. | 422/147 |

FOREIGN PATENT DOCUMENTS

| | | |
|---|---|---|
| 481438A2 | 4/1992 | European Pat. Off. . |
| 86964 | 7/1992 | Finland . |

*Primary Examiner*—Robert J. Warden
*Assistant Examiner*—Hien Tran
*Attorney, Agent, or Firm*—Nixon & Vanderhye

[57] ABSTRACT

The present invention relates to a combined cycle power plant comprising a air compressor providing pressurized air at pressure greater than 2 bar; a gas turbine means for driving the gas compressor means; a pressure vessel, circular in cross-section, connected to said air compressor and being capable of withstanding pressures greater than 2 bar; a pressurized circulating fluidized bed reactor enclosed by the pressure vessel, the circulating fluidized bed reactor having a reactor chamber, including substantially planar steam generation tube walls having a bottom section; means for leading hot combustion gases away from said reactor; one or more non-circular centrifugal separator(s) disposed within said pressure vessel being adapted to the reactor chamber and internal pressure vessel geometry for receiving and purifying hot combustion gases, having a gas outlet leading from said separator out of said pressure vessel; said centrifugal separator comprising a vertical vortex chamber having distinctly planar steam generation tube walls defining an interior gas space; and a bubbling fluidized bed heat exchanger chamber having distinctly planar steam generation tube walls defining an interior of said chamber, said chamber being connected to the bottom section of said reactor chamber; a heat recovery unit adapted to the gas turbine means for recovering heat from gas discharged therefrom; a steam generation cycle having a steam turbine, steam generation surfaces including said steam generation walls, and steam superheating surfaces.

29 Claims, 5 Drawing Sheets

COMBINED CYCLE POWER PLANT WITH CIRCULATING FLUIDIZED BED REACTOR

CROSS-REFERENCE TO RELATED APPLICATIONS

This application is a continuation-in-part of Ser. No. 164,888, filed Dec. 10, 1993, now U.S. Pat. No. 5,460,788, which is a continuation-in-part of Ser. No. 953,297, filed Sep. 30, 1992, now U.S. Pat. No. 5,281,398, which is in turn a continuation of application Ser. No. 07/765,450, filed Sep. 25, 1991, now abandoned, the disclosures of which are hereby incorporated by reference herein.

BACKGROUND AND SUMMARY OF THE INVENTION

Pressurized fluidized bed reactors are known, such as shown in U.S. Pat. No. 4,869,207. In those reactors, a pressure vessel containing the reactor chamber is kept at super atmospheric pressure, that is a pressure of 2 bar or more, and preferably at a pressure of about 8–16 bar (for the combustor), although the pressure varies substantially from one installation to another, or within an installation during the operation. A very significant cost of such pressurized reactors, however, is the pressure vessel itself. As the volume of the pressure vessel increases, the costs escalate in a geometric rather than linear manner. Reducing the sizes of components, rearranging components, or eliminating the need for components, can therefore have a dramatic effect on the cost of the vessel and the competitiveness of the process. Therefore, it is desirable to maintain the pressure vessel at minimum size. One component that consumes significant space within the vessel is the conventional hot cyclone. When a conventional cyclone separator is utilized with the reactor chamber within the pressure vessel there is significant wasted space, and the pressure vessel must be made proportionately larger in order to accommodate a conventional cyclone. If the cyclone is placed outside the main pressure vessel which contains the reactor chamber, then a separate pressure vessel must be provided. Also, conduits and seals leading the hot flue gases from the reactor chamber to the externally located cyclone separator must be provided, as well as recirculating conduit between the externally located cyclone separator and the reactor vessel. These would further increase the costs and also make the maintenance more complicated.

In an atmospheric circulating fluidized bed reactor with a cyclone separator that is distinctly non-circular, and typically having a quadrate cross-section of the vortex chamber or gas separator therein. In this kind of system for atmospheric combustion of fuel material, the geometry is for atmospheric applications and the design of the geometry is ruled mainly by manufacturing and/or erection costs and adaptation of cooled cyclone to the cooled reactor walls. In contrast, for pressurized applications of a circulating fluidized bed reactor, other distinct benefits can be achieved by design of the geometry of the reactor which advantages would not be considered important and/or would not apply for atmospheric applications.

As can be seen for example from U.S. Pat. No. 4,793,292, in pressurized fluidized bed applications it has commonly been considered essential to utilize the gas space of the pressure vessel as efficiently as possible. That demand has previously been tried to be accomplished by forming the reactor cross section to follow the circular form of the pressure vessel as strictly as possibly. For example, U.S. Pat. No. 4,593,292 shows several modifications of reactor cross section and even a reactor alternative (including a separator) made of plurality planar walls, in order to approach a circularly formed cross section.

In atmospheric reactors there are no special requirements to the form of the cross section. However, it has surprisingly been found according to the present invention that when the distinctly non-circular cyclone separator, or a plurality thereof, are provided in association with a pressurized fluidized bed reactor, contrary to common practice using circular cyclone separators, the cross-over duct to the circular cyclone separator can be eliminated as the non-circular cyclone can be located adjacent to the reactor. This elimination of the cross-over duct yields a much more compact arrangement and allows a minimum sized pressure vessel, and thus results in economic construction of a pressurized fluidized bed reactor. There is also no need to locate a cyclone external to the pressure vessel in a separate auxiliary pressure vessel, since the compact arrangement of the furnace and non-circular cyclones can be conveniently arranged to closely fit within a circular space.

The compact arrangement of the cyclone separator in the pressurized fluidized bed reactor according to the present invention has still other advantages. Firstly, because of the compact nature and arrangement thereof, there is room for other structures, for example allowing ceramic filter elements, such as ceramic candle or honeycomb filters, to be mounted in the same pressure vessel as the reactor chamber and the cyclone separator (e.g. below or above the cyclone separator). Thus, a second pressure vessel is not necessarily needed to be provided for gas filtration, thereby reducing the costs of a complete system substantially. Also, the compact arrangement results in other advantages for the pressurized combined-cycle system. The compact structure of, not only the cyclone separator, but the whole Pressurized Circulating Fluidized Bed (PCFB) reactor, results in optimized space utilization of the pressure vessel. In a combined cycle process the operation of a gas turbine and steam turbine is combined, and therefore the steam generation circuit is not similar to that of Atmospheric Circulating Fluidized Bed (ACFB) combustion process. In combined cycle process the gas from the PCFB reactor may not preferably be cooled (contrary to ACFB where the gases should be cooled) in order to maintain gas turbine cycle efficiency at acceptable level.

Secondly, because of the compact nature and arrangement thereof, there is room to locate a bubbling Compact fluidized bed HEat exchanger (CHEX) below the non-circular cyclone. This heat exchanger can be arranged such that it has a similar cross-sectional profile to the cyclone which is above it, and it can receive hot solids from either the downcomer of the non-circular hot cyclone, or from the downflow of solids along the internal reactor walls. Heat transfer surfaces integrated into this heat exchanger can then be used to provide heated fluids used in the combined cycle power plant.

Thirdly, the cycle can also benefit from the use of high pressure steam, such as supercritical and ultra-supercritical conditions, to arranging heat transfer surfaces within the reactor using omega panels, or within the bubbling bed CHEX. This ability allows for the achievement and control of steam conditions and steam temperatures, and takes advantage of the differing heat transfer characteristics of the reactor and the CHEX. In such supercritical or ultra-supercritical steam applications a once-through steam cycle could be used and steam separator, rather than a conventional steam drum which supports natural circulation, would be applied.

According to an aspect of the present invention, a combined cycle power plant is provided, comprising the following elements: a gas compressor means for providing pressurized gas at pressure greater than 2 bar; a gas turbine means for driving the gas compressor means; a pressure vessel, circular in cross-section, and capable of withstanding pressures greater than 2 bar, and having a top and a bottom section; a pressurized circulating fluidized bed reactor enclosed by the pressure vessel, the circulating fluidized bed reactor having a reactor chamber including substantially planar walls; means for conveying the pressurized gas into said pressure vessel; means for feeding fuel into said reactor chamber; means for leading hot combustion gases away from said reactor; a centrifugal separator disposed within said pressure vessel, and having an inlet connected to said means for leading hot combustion gases away from said reactor chamber, a gas outlet leading from said separator out of said pressure vessel to the gas turbine means for expansion therein, and a return duct for recirculating separated solid particles from said separator to said reactor chamber; said centrifugal separator comprising a vertical vortex chamber having distinctly planar walls defining an interior gas space, said gas space having a cross section that is distinctly non-circular, having a circularity greater than or equal to 1.15; and a bubbling fluidized bed heat exchanger chamber in communication with said reactor chamber, said fluidized bed heat exchanger chamber having common wall sections with both the substantially planar side walls of the reactor chamber and the distinctly planar walls of the vertical vortex chamber.

According to a preferred embodiment of the present invention the combined cycle power plant includes a gas compressor providing pressurized gas (preferably air) for pressurizing the pressure vessel. The pressurized air is utilized as combustion air in the PCFB reactor enclosed by the pressure vessel. The PCFB reactor is operated as circulating fluidized bed wherein a considerable amount of solids is entrained with the gas into upper section of a reactor chamber of the PCFB reactor and further out of the reactor to the cyclone separator(s). Gas is cleaned from coarser particles (typically greater than about 25 μm) in the cyclone separator(s), which separated particles are recycled back to the reactor chamber. Thus cleaned gas is passed (preferably after fine filtration) substantially uncooled into a gas turbine adapted to preferably drive the gas compressor and a generator for producing electricity. The expanded, still considerably hot gas is passed into Heat Recovery Steam Generator (HRSG) in which the heat of the expanded gas is utilized for steam generation prior to its venting into the atmosphere. The HRSG steam generation circuit is according to the present invention connected to the PCFB reactor cooling surfaces.

The PCFB reactor including the compact separator(s) according to the present invention is provided with so called membrane walls having plurality of tubes connected with each other by fins. The walls of the PCFB reactor are preferably cooled by producing steam in the tubes of the walls.

In a preferred embodiment of the present invention the PCFB reactor includes heat transfer surfaces inside the reactor chamber, preferably at least at its upper section. Such heat transfer surfaces may be so called Omega-panels which are suitable to prevailing conditions. Also according to this preferred embodiment the PCFB includes a so called Compact Heat EXchanger (CHEX) preferably at the bottom section of the reactor chamber. The CHEX is preferably connected to the reactor chamber so that it is capable of receiving solid material directly from the reactor chamber, naturally also material separated from the gas in the cyclone separator(s) may be passed into the CHEX. The CHEX is preferably a bubbling bed fluidized bed heat exchanger including heat transfer surfaces immersed in the fluidized bed of the solid material therein.

The CHEX, as well as the non-circular compact separator(s) is provided according to the present invention in connection with the PCFB reactor by utilizing a common steam generation membrane walls of the PCFB reactor. Also, the common steam generation circuit includes preferably sections in each of the above components. In this manner e.g. the thermal expansion is substantially similar to each of these components resulting in a reliable PCFB system. According to the present invention a most efficient and flexible combined cycle power plant as well as process is provided by combining the HRSG steam generation system with the steam generation system of the PCFB reactor, particularly the heat transfer surfaces inside the reactor chamber i.e. the Omega-panels and the heat transfer surfaces immersed in the fluidized bed of the solid material of the CHEX. This manner the steam generation, super heating and/or reheating of steam may be accomplished by suitably utilizing the whole system. Surprisingly it has been found that particularly a PCFB reactor according to the present invention provides an unparalleled system for combined cycle process. The present invention makes it possible to enclose substantially all required components sections of the PCFB reactor, including a reactor chamber, solid separator(s) and fluidized bed heat exchanger (CHEX), in a single pressure vessel, with optimized utilization of the space within said pressure vessel.

According to a preferred embodiment of the present invention the steam cycle of the combined cycle process comprises steam generation membrane walls of the PCFB reactor, steam generation heat transfer surfaces in the HRSG flue gas pass, steam superheating and/or reheating heat transfer surfaces in the CHEX and in the reactor chamber of the PCFB reactor. The steam generated in the steam generation walls and surfaces is superheated prior to its feeding into a steam turbine for electricity generation. In case of several e.g. two stage turbine is used the steam from the first (intermediate) stage is preferably reheated before feeding into the second (subsequent/final) stage. The present invention makes it possible to arrange adequate superheating and reheating heat transfer surfaces in connection with the PCFB reactor in a substantially small diameter pressure vessel, by providing a compact PCFB reactor.

Advantageously the superheating of steam is controlled according to the present invention by optionally directing superheated or reheated steam to the heat transfer surface in the reactor chamber of the PCFB and to the heat transfer surfaces in the CHEX, or vice versa depending on the design conditions and operating load of the power plant. At low load conditions the amount of heat removed in the CHEX can be reduced or eliminated by reducing air flow to the CHEX and by bypassing the flow of solids through it. Therefore according to the present invention the solids may be passed into the CHEX, or may bypass the CHEX, for superheating and/or reheating of the steam. Due to the compact structure of the PCFB reactor all necessary devices are possible to arrange in a single pressure vessel.

The centrifugal separator disposed within the pressure vessel has an inlet connected to a means for leading hot combustion gases away from the reactor chamber, a gas outlet leading from the separator to the next processing phase, which usually is a ceramic filter or other particulate removal device located inside or outside of the vessel, and ultimately out of the pressure vessel to depressurization in the gas turbine and low level heat recovery. A solids return duct for recirculating separated solid particles from the separator to the CHEX, or directly to the reactor chamber, is also provided. The centrifugal separator comprises a vertical vortex chamber having distinctly non-cylindrical walls defining an interior gas space, the gas space having a cross section that is distinctly noncircular, having a circularity greater than or equal to 1.15. The gas space typically has a quadrate cross section, the cyclone separator made from substantially flat panels.

The centrifugal separator may comprise a first centrifugal separator, and there may be a second centrifugal separator having the same basic components, as described above, as the first separator. Separators may be disposed on opposite sides of the reactor chamber, connected to the reactor chamber side walls, or may be disposed on the same side of the reactor chamber positioned next to each other or one above the other. If they are positioned one above the other, and if one separator gas outlet discharges upwardly, the other (the upper separator) preferably discharges downwardly so that there is a common plenum connected to the gas outlets. In order to optimize the arrangement of the reactor, non-circular cyclones, CHEXs, and potentially ceramic filters within the vessel, multiple substantially identical separators may be provided mounted in groups (e.g. pairs) on opposite sides of the reactor chamber. The reactor chamber may have a first cross-sectional area, and each of the separators has a second cross-sectional area of the gas space thereof, and those cross-sectional areas may be substantially equal.

The gas compressor means for pressurizing the pressure vessel may comprise means for introducing oxygen containing gas under pressure to the vessel to pressurize the interior of, the pressurizing gas flow also comprising means for supplying fluidizing gas to the reactor chamber at the bottom thereof. The omega panels may be provided in the reactor chamber extending along the length thereof and the separators may be mounted on the lengthways sides of the reactor chamber, parallel to the omega panels.

The reactor may further comprise a plurality of ceramic filtering means such as candle, monolithic, or honeycomb filters mounted in a support structure within the pressure vessel, and having a dirty gas inlet, a clean gas outlet, and an ash outlet; the dirty gas inlet connected to the separator gas outlet. The term "ceramic filtering means" as used in the specification and claims means conventional ceramic candle, monolith, or honeycomb filters, or improved filters developed in the future, capable of filtering particles out of high temperature gases such as flue gases from fluidized bed reactors. A number of different arrangements may be utilized to accommodate the ceramic filtering means. In one arrangement, the separator is mounted along a side of the reactor chamber connected to a side wall thereof, and the gas outlet is directed downwardly, and the support structure and the ceramic filtering means filters are mounted to the same side wall of the reactor chamber as the separator, beneath the separator, the filters of the filtering means extending generally horizontally.

According to still another aspect of the present invention a combined cycle power plant is provided, the plant comprising a air compressor providing pressurized air at pressure greater than 2 bar; a gas turbine means for driving the gas compressor means; a pressure vessel, circular in cross-section, connected to said air compressor and being capable of withstanding pressures greater than 2 bar; a pressurized circulating fluidized bed reactor enclosed by the pressure vessel, the circulating fluidized bed reactor having a reactor chamber, rectangular in cross-section, including substantially planar steam generation tube walls having a bottom section; means for leading hot combustion gases away from said reactor; a centrifugal separator disposed within said pressure vessel being adapted to the reactor chamber for receiving and purifying hot combustion gases, having a gas outlet leading from said separator out of said pressure vessel; said centrifugal separator comprising a vertical vortex chamber having distinctly planar steam generation tube walls defining an interior gas space; and a CHEX bubbling fluidized bed heat exchanger chamber having distinctly planar steam generation tube walls defining an interior of said chamber, said chamber being connected to the bottom section of said reactor chamber; a heat recovery unit adapted to the gas turbine means for recovering heat from gas discharged therefrom; a steam generation cycle having a steam turbine, steam generation surfaces including said steam generation walls, and steam superheating surfaces.

It is the primary object of the present invention to provide a combined cycle power plant with a pressurized circulating fluidized bed reactor with cyclone separator(s), as well as compact, integrated bubbling bed fluidized bed heat exchanger(s) within the pressure vessel. This and other objects of the invention will become clear from an inspection of the detailed description of the invention, and from the appended claims.

DETAILED DESCRIPTION OF THE DRAWINGS

Figure 1:
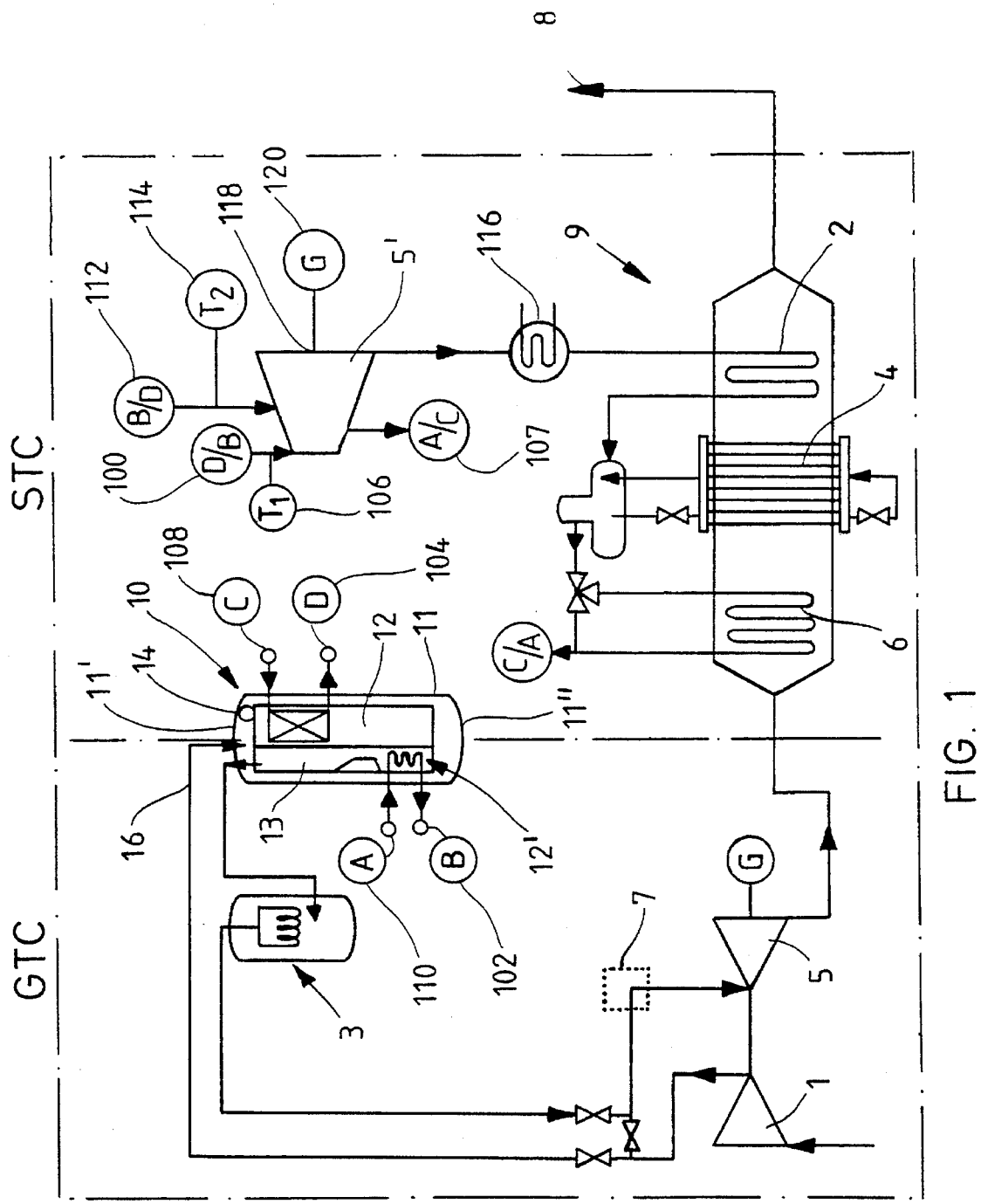
FIG. 1 is an illustration of the combined cycle power plant with a pressurized circulating fluidized bed according to the present invention.

FIG. 1 shows an illustrative depiction of a combined cycle power plant process with a pressurized circulating fluidized bed. A combined cycle process integrates a gas turbine and steam turbine cycles, exemplary shown by dotted lines and markings "GTC" for the Gas Turbine Cycle, and "STC" for the Steam Turbine Cycle. The gas turbine cycle includes a gas compressor 1 for compressing the air into super atmospheric pressure and the pressurized air is conveyed into a PCFB reactor shown generally by a reference numeral 10 in FIGS. 1, 2 and 3. The PCFB reactor is enclosed by a pressure vessel 11 withstanding the prevailing pressure difference. The compressed gas is further conveyed in a gas space between the reactor and the vessel into the reactor to be used as reaction gas in the reactor. The present invention is described herein as a combustion process, but it should understood that also other processes, such as gasification may by adapted. The air and fuel material is combusted in the PCFB reactor at super atmospheric condition in a circulating fluidized bed in the reactor 10 which generates hot flue gases. The gases are passed after discharging from a cyclone(s) 13 into a fine filtration unit, generally referred by a numeral 3. The fine filtration unit is provided to withstand the high temperature (typically 600°–1000° C.) and high pressure (typically 2–20 bar) of the process. The filtration unit is shown to be distinct from the vessel 11 but it may also be integrated into the same vessel 11 as the reactor 10, to be described later. Cleaned gases are passed into a gas turbine 5 for expansion therein. The gas turbine may also be provided with an additional combustion chamber 7 for raising the temperature of the gases prior to feeding into the turbine 5.

Expanded, but still hot gases are passed through a Heat Recovery Steam Generator (HRSG) 9 system for recovering heat from the gases prior to expelling into atmosphere via a stack 8. The steam turbine cycle according to the present invention is connecting both HRSG 9 and PCFB 10. Feed water is warmed by the flue gases at the HRSG 9 by preheater heat exchanger 2 and further evaporated by evaporator 4. For simplicity, the process is illustrated only in very schematic manner, but persons of ordinary skill in the art will readily understand the combined cycle system shown in FIG. 1.

The PCFB reactor 10 is formed of cooled walls, preferably made of so called membrane walls. This is not shown in FIG. 1 in detailed but the steam drum 14 illustrate that steam generation takes place in PCFB reactor 10. The illustration of the steam drum does not mean in this context that necessarily only such steam generations are referred to (or possible) which require the drum, for example a supercritical flow-through cycle may by utilized as well. The cycle can also benefit from the use of high pressure steam, such as supercritical and ultra-supercritical conditions, by the ability to arrange heat transfer surfaces within the reactor using omega panels, or within the bubbling bed CHEX, allowing for achievement and control of steam conditions and steam temperatures, and taking advantage of the differing heat transfer characteristics of the reactor and the CHEX. In such supercritical or ultra-supercritical applications a once-through steam cycle would be used and steam separator, rather than a conventional steam drum which supports natural circulation, would be applied.

The drum or steam separator 14 in this connection includes conduits and other required means for connecting the steam generation facilities of the PCFB 10 and HRSG 9. Produced steam is superheated by using HRSG superheater 6 and/or superheating heat exchangers of the PCFB. The superheating heat exchangers according to the present invention are provided into the reactor chamber 12 and/or into an integrated Compact Heat EXchanger (CHEX) 12' according to the present invention. Produced superheated steam in directed into a steam turbine 5' at its first stage inlet 100 (D/B) for expansion and driving a generator producing electricity. The reference (D/B) is for illustrating the various controlling strategies and/or couplings associated with the reactor outlets 102, 104 and the turbine first stage inlet 100. These may be applied in a manner of having at least the steam inlet temperature 106 T1 as a controlling variable. The expanded steam from the first stage outlet 107 (A/C) is directed back to the inlets 108, 110 of the PCFB reactor 10 for reheating the steam, again the reference (A/C) stands for various coupling alternatives. Reheated steam is directed from reactor outlets 102, 104 to the second stage inlet 112 (B/D) at steam inlet temperature 114T2 for final expansion of the steam. The steam from the turbine 5' is directed to a condenser 116 and the condensed water further into the preheater 2 in the stem cycle circuit. The mechanical rotary power output 118 of the steam turbine 5' may be applied to turn a power generator G120 (120). The basic steam generation circuit may vary according to the process. The advantageous possibility of steam superheating/reheating in the PCFB 10 is made possible according to the present invention and still retaining in a substantially moderate sized pressure vessel.

Figure 2:
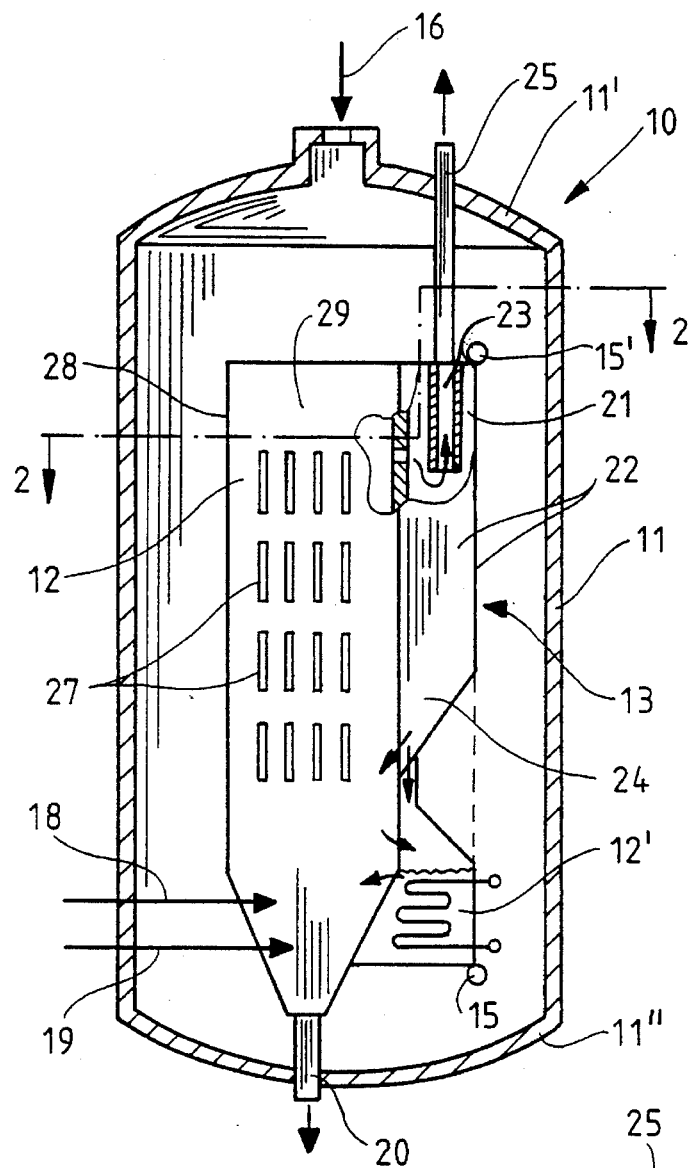
FIG. 2 is a longitudinal view, partly in cross-section and partly in elevation, of an exemplary pressurized fluidized bed reactor according to the present invention.
Figure 3:
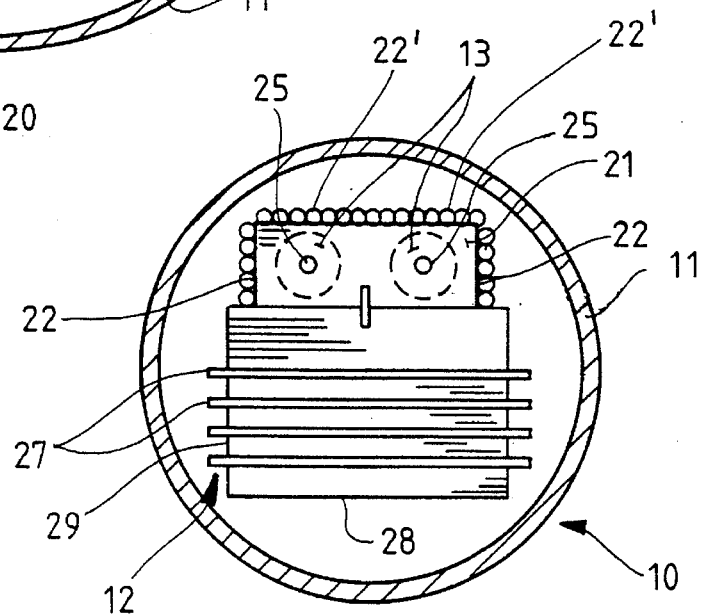
FIG. 3 is a cross-sectional view of the reactor of FIG. 2 taken along lines 2—2 thereof.

One embodiment of an exemplary circulating pressurized circulating fluidized bed reactor according to the present invention is shown generally, but more detailed than in FIG. 1, by reference numeral 10 in FIGS. 2 and 3. The reactor 10 comprises a pressure vessel 11 containing a reactor chamber 12 therein as well as one or more (e.g. two in FIGS. 2 and 3) centrifugal separators (cyclones) 13. The pressure vessel 11, typically made out of specialized steel, is circular in cross-section (as seen in FIG. 3), and is capable of withstanding super atmospheric pressures, greater than 2 bar (e.g. about 8–16 bar). The vessel 11 has a top 11' and a bottom 11".

The gas compressor 1 as shown in FIG. 1 is provided for pressurizing the vessel 11 to a pressure of greater than 2 bar (e.g. about 8–16). Pressurizing may be provided by forcing oxygen containing gas under pressure through line 16 (see FIG. 2) at the top of the vessel 11, since the vessel 11 is pressure tight the entire interior volume of the vessel reaching essentially the pressure of the pressurizing gas 16. The gas 16 is oxygen containing gas, preferably air, and is also used to flow upwardly into the reactor chamber 12 through its bottom section to provide combustion (gasification) and/or fluidizing gas therein. Conventional means are also provided for feeding fuel into the reactor chamber (indicated schematically at 18 in FIG. 2) and for providing other materials to the chamber, such as sorbents for absorbing pollutants (e.g. limestone), as indicated schematically at 19. A conduit 17 may be provided at the bottom of reactor chamber 12 for introducing fluidizing gas to maintain a fluidized bed in chamber 12. The fuel may be coal, oil, biomass, or other carbon containing or hydrogen containing fuels typically in solid particulate form, or as slurry made of fuel by mixing it with e.g. water and sorbents. Also, a conventional ash discharge is provided from the reactor chamber 12, as illustrated schematically at 20 in FIG. 2.

The reactor 10 also includes a centrifugal separator or separators 13 according to the present invention, such as are shown in U.S. Pat. No. 5,281,398. That is, each separator 13 has a vertical vortex chamber or gas space 21 (see FIG. 2) having distinctly non-cylindrical walls 22 defining a vortex chamber or interior gas space 21 having a cross-section that is distinctly non-circular. Typically, chamber or gas space 21 has a circularity greater than one, preferably greater than 1.1, and even more preferable greater than or equal to 1.15. The preferred construction, as illustrated in FIGS. 2 and 3, is a quadrate (e.g. square) cross-section for the chamber 21, the separators 13 constructed of primarily substantially flat, cooled panels. Not only does this arrangement provide a more compact space, it also allows the separators 13 to be constructed more inexpensively than circular, conventional separators.

Each separator 13 also has a vortex finder 23 within the interior thereof, and a return duct 24 for recirculating separated solid particles from the separator 13 back to, for example, the reactor chamber 12. A gas outlet 25 is provided from the chamber 21, concentric with the vortex finder 23, in the embodiment illustrated in FIGS. 2 and 3 the gas outlet conduit 25 passing through an appropriate seal through the top of the pressure vessel 11.

Various water cooled panels may be provided for the components within the reactor 10 in order to recover heat from combustion within the reactor chamber 12, and to maintain the longevity of the components. Preferably example omega panels 27, parallel to the length dimension 28 of the reactor chamber 12 (perpendicular to the width dimension 29 thereof), may be provided for recovery of heat from the chamber 12 in a form of superheated steam to be utilized in the steam turbine. Water cooled panels 22' are also provided associated with the separators 13, for example, the walls or panels 22 being formed of water tubes, such as described in the parent applications. In the embodiment of FIGS. 2 and 3, two cyclone separators 13 are provided mounted on one lengthwise wall 28 of the reactor chamber 12, side by side. This is only one exemplary embodiment, and numerous other arrangements are also possible.

The reactor 10 includes also an integrated fluidized bed Compact Heat EXchanger (CHEX) 12'. The CHEX 12' is proved preferably at the bottom section of the reactor 10, below the cyclone(s) 13. In this manner the CHEX may not essentially require any extra cross-sectional space in the pressure vessel and can be situated within the vertical projection of space used by the cyclone(s). Advantageously according to the present invention the same panels 22 are used for forming both the separator(s) 13 and also the CHEX 12'. Lower and upper collectors, 15 and 15' respectively, are shown to illustrate the existence of steam producing tube walls. The side walls are substantially straight and the rear wall is bent suitably for forming the rear walls of the cyclone(s) and CHEX.

The present invention provides a surprisingly versatile and advantageous pressurized circulating fluidized bed reactor. According to the present invention it is possible to produce hot pressurized gas for driving gas turbine and simultaneously provide flexible means for steam production by using the compact pressurized circulating fluidized bed according to the present invention. The flue gas is delivered from the reactor as high as possible to maximize the efficiency of the gas turbine used in the cycle, therefore the gases are not normally cooled after discharging from the reactor. Should there, however, exist a need to protect any components from over heating only necessary amount of heat is extracted from the gases. Typically, the gases discharged from the PCFB reactor are at temperature range of 650°–950° C. Superheating and/or reheating of steam is performed by utilizing the heat exchangers in the reactor chamber 10 and/or CHEX bubbling fluidized bed. According to the present invention it is possible to provide the facilities for hot gas and superheated steam production in a single pressure vessel 11.

Figure 4:
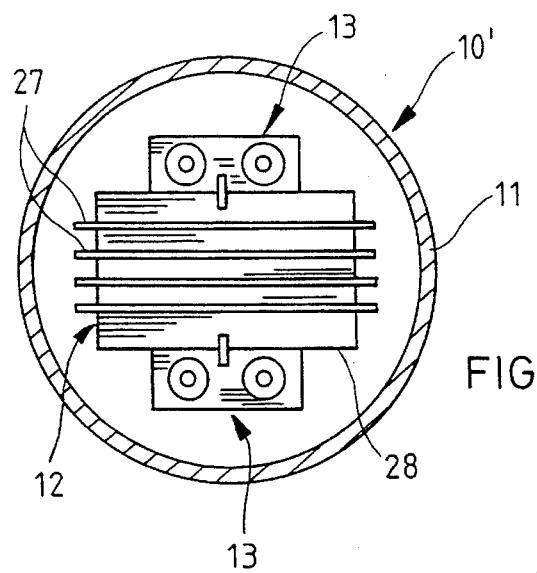
FIG. 4 is a view like that of FIG. 3 only showing a slightly different embodiment of reactor.
Figure 5:
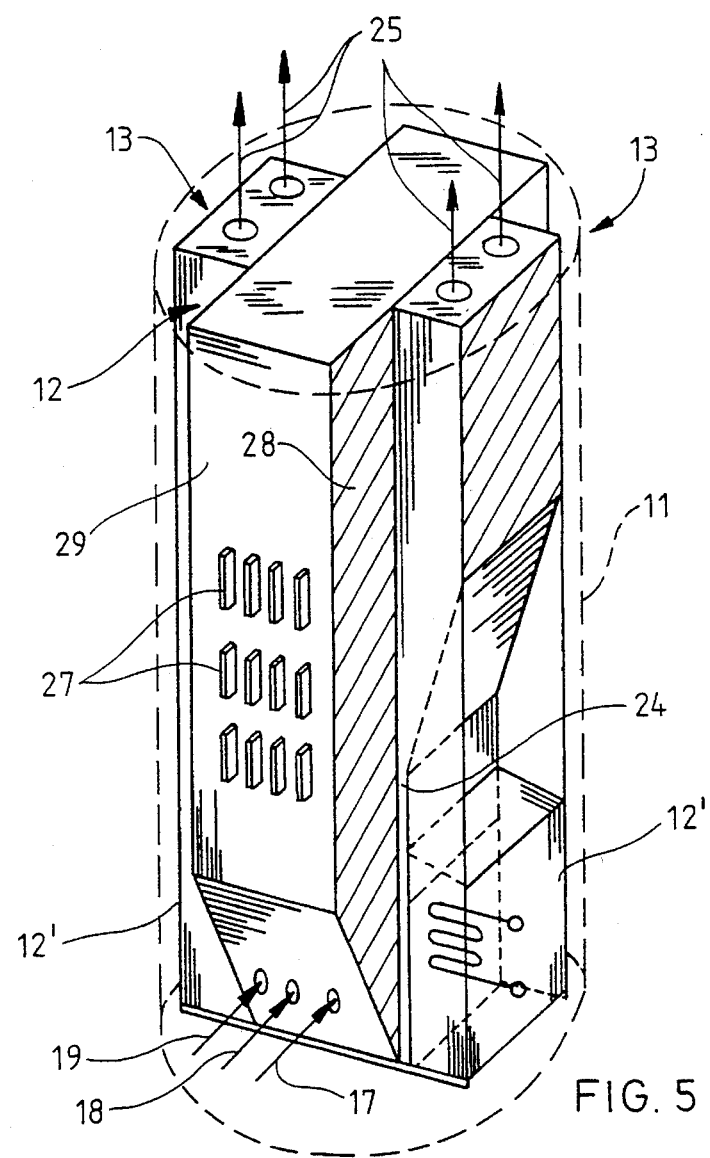
FIG. 5 is a top perspective view of the reactor of FIG. 4 showing the pressure vessel itself in dotted line.

FIGS. 4 and 5 show another reactor 10' according to the present invention, the reactor 10' being substantially identical to the reactor 10 except for the number of cyclone separators. In this embodiment there is a separator unit 13 in both sides of the reactor 10' each unit comprising of two separating vortices. According to the present invention the Compact Heat EXchangers 12' are provided below the cyclone units 13. The CHEX units comprise a bubbling fluidized bed with heat exchangers immersed therein. Preferably the CHEX units are made of common wall structures with the cyclones above them. This manner the support of the reactor 10 within the pressure vessel may be provided efficiently, so this feature of the present invention is specifically advantageous in connection with combined cycle processes.

Figure 6:
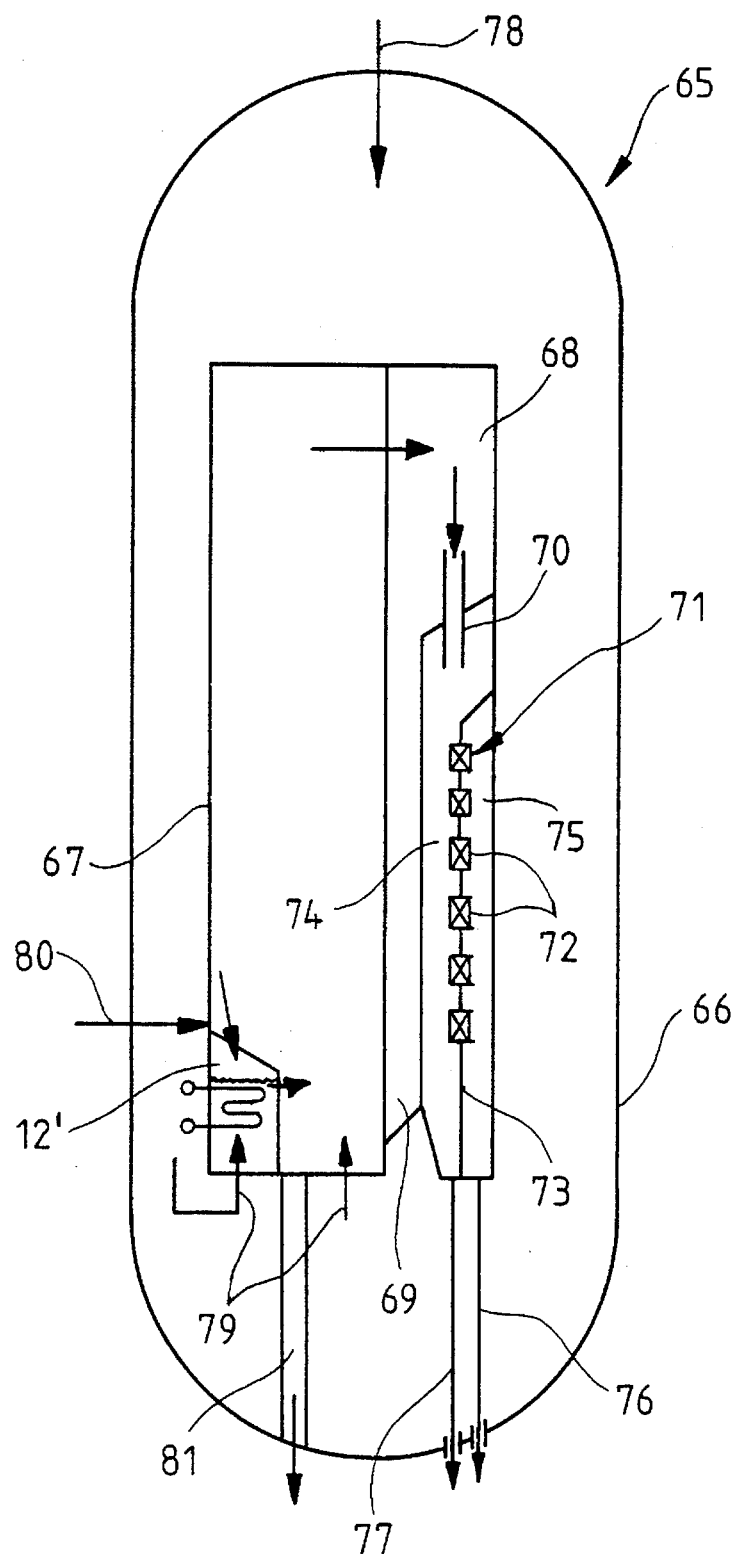
FIG. 6 is a side illustrative view of another exemplary reactor according to the present invention showing gas filtering elements mounted on the pressure vessel adjacent the cyclone separator gas outlet.

FIG. 6 show schematically, and in slightly more detail, one embodiment of a pressurized circulating fluidized bed reactor 65 according to the present invention which contains ceramic filter elements. Within the pressure vessel 66 is the reaction chamber 67, one or more quadrate cross section cyclones 68 mounted on one or opposite sides of the reactor chamber 67, a particles recirculating conduit 69 from the cyclone 68, and the gas outlet 70 from the cyclone 68 leading to the ceramic filtering means 71. The individual filters of the ceramic filtering means are shown by reference numerals 72 in FIG. 6, and are shown extending generally horizontally, mounted by a support structure 73, and having a dirty gas inlet 74 on one side thereof (communicating with the conduit 70), and a clean gas chamber 75 on the opposite side thereof, communicating with the clean gas outlet 76 penetrating the pressure vessel 66 and leading to further processing (e.g. to a turbine for expansion ). An ash outlet, e.g. for fly ash or other particles, is provided at 77 in the bottom of the dirty gas chamber 74, which is for disposal of the particles separated from the gas passing through the filters 72. The particles are typically dislodged by backflushing the filter 72 in a conventional manner, such as shown in U.S. Pat. No. 5,242,472 (not shown in the drawings here).

As seen in FIG. 6, air under pressure is introduced at 78 to the top of the pressure vessel 66, passes around the reactor chamber 67 to flow upwardly as separately controlled fluidizing air as illustrated at 79, fuel and sorbents, or the like, are added to the reactor chamber 67 as indicated at 80, and ash for disposal is removed through conduit 81 at the bottom of the reactor chamber 67. Utilizing the teachings of the present invention, it is cost effective to provide sufficient filter area within the reactor pressure vessel 66 to effectively filter all of the gas produced by a reactor of substantially optimum size provided within the vessel 66. A part of the fluidizing gas is supplied into the CHEX 12' for providing a bubbling fluidized bed of solids therein. In this embodiment the CHEX is provided inside the reactor chamber since the space below the cyclone(s) 68 is reserved for the filters. However, again both the CHEX and the filter chambers may be provided in a manner not increasing the cross-sectional area of the pressure vessel.

Figure 7:
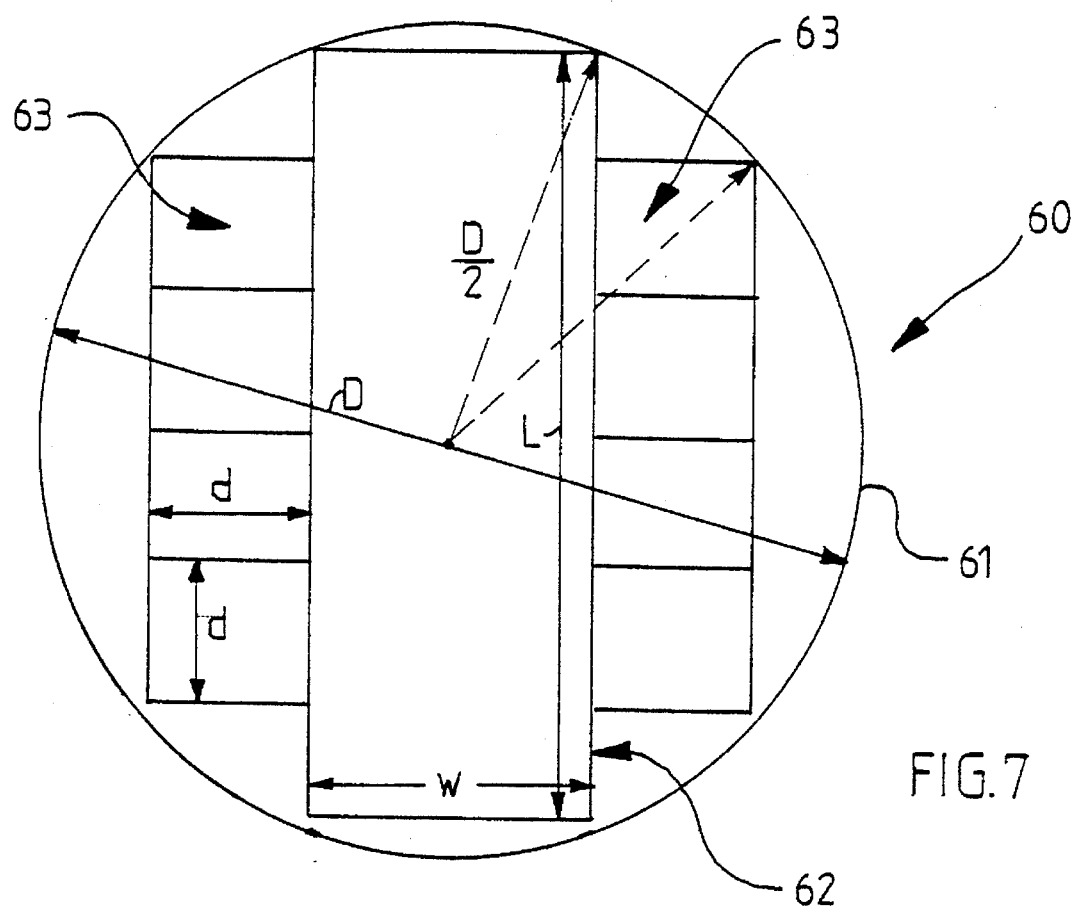
FIG. 7 is a sectional view of another embodiment of a reactor according to the present invention, showing various dimensional relationships.

FIG. 7 illustrates schematically a reactor 60 having dimensional indications thereon for the purpose of illustrating how an optimized size of reactor chamber for a particular diameter pressure vessel 61 may be mathematically calculated. The pressure vessel 61 has an internal diameter D, while the reactor chamber 62 has a width dimension w and a length dimension L. A plurality of cyclone separators 63 are shown on each side of the chamber 62, x number of separators 63 being provided, each shown as having a square cross-section of side dimensions d.

As is clear from FIG. 7, the cross-sectional area of the reactor chamber 62 is L times w, while the area of the vortex chambers of the cyclone 63 is x (in this case 8) times $d^2$. Since it desirable that die area of the reactor chamber 62 equal the area of the vortex chamber 63, the following equations are accurate:

$$\sqrt{\left(\frac{L}{2}\right)^2 + \left(\frac{w}{2}\right)^2} \leq \frac{D}{2}$$

$$\sqrt{\left(\left(\frac{w}{2}+d\right)^2+0.0625\,x^2\,d^2\right)} \leq \frac{D}{2}$$

Thus, by substituting in desired values for x and D the maximum area of the reactor chamber 62 may be calculated mathematically. Of course, the maximum reactor chamber area is not always used, however, since more economical and cost effective solutions may exist due to other factors such as the inlets and outlets of the pressure vessel, the positioning of various accessories, etc., but the maximum size calculation for the reactor chamber 62 is worthwhile in many circumstances.

The invention is also and more particularly, advantageous in providing the ability to eliminate a separate pressure vessel for filtering of the gases discharged from the outlets of the centrifugal separators, such as by using ceramic filtering means, such as shown in U.S. Pat. Nos. 5,114,581 and 4,793,292. Such arrangements provide a larger filter area/volume ratio which reduces the space required for a filter unit, and allows mounting of the units directly within a pressure vessel, the particular combination of the pressure vessel and quadrate cyclones according to the present invention providing sufficient interior space to allow mounting of the ceramic filters within the same pressure vessel as the reactor chamber and cyclone.

It will thus be seen that according to the present invention a compact, cost-effective, efficient pressurized circulating fluidized bed reactor has been provided as well as a combined cycle power plant with a PCFB reactor. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. Combined cycle power plant comprising:
    a gas compressor means for providing pressurized gas at pressure greater than 2 bar;
    a gas turbine means for driving the gas compressor means;
    a pressure vessel, circular in cross-section, and capable of withstanding pressures greater than 2 bar, and having a top and a bottom section;
    a pressurized circulating fluidized bed reactor enclosed by the pressure vessel, the circulating fluidized bed reactor having a reactor chamber including substantially planar walls;
    means for conveying the pressurized gas from said gas compressor means into said pressure vessel;
    means for feeding fuel into said reactor chamber;
    means for leading hot combustion gases away from said reactor;
    at least one centrifugal separator disposed within said pressure vessel, and having an inlet connected to said means for leading hot combustion gases away from said reactor chamber, a gas outlet leading from said at least one separator out of said pressure vessel to the gas turbine means for expansion therein, and a return duct for recirculating separated solid particles from said separator to said reactor chamber;
    said at least one centrifugal separator comprising a vertical vortex chamber having distinctly planar walls defining an interior gas space, said gas space having a cross section that is distinctly non-circular, having a circularity greater than or equal to 1.15; and
    a bubbling fluidized bed heat exchanger chamber disposed in the pressure vessel and in communication with said reactor chamber, said fluidized bed heat exchanger chamber having a common wall section with a substantially planar wall of the reactor chamber, wherein the bubbling fluidized heat exchanger chamber is positioned below the vortex chamber, has a second wall and third wall each formed of an extension of a respective planar side wall of the vortex chamber, and the heat exchanger chamber has a cross-sectional profile similar to a cross-sectional profile of the vortex chamber.

2. A combined cycle power plant as recited in claim 1 wherein said gas space has a quadrate cross section, the at least one centrifugal separator has substantially flat water tube panels at an outer periphery of the separator.

3. A combined cycle power plant as recited in claim 1 wherein said at least one centrifugal separator comprises at least two separators substantially identical disposed on the same side of said reactor chamber, connected to said reactor chamber walls.

4. A combined cycle power plant as recited in claim 1 wherein said at least one centrifugal separator comprises at least two separators substantially identical disposed on the opposite side of said reactor chamber, connected to said reactor chamber walls.

5. A combined cycle power plant as recited in claim 3 wherein said at least one separator is mounted next to each other, side-by-side, on one side of said reactor chamber.

6. A combined cycle power plant as recited in claim 1 wherein said at least one centrifugal separator comprises a first centrifugal separator; and further comprising three other centrifugal separators, substantially identical to said first centrifugal separator and mounted within said pressure vessel, said separators mounted in pairs, next to each other, side-by-side, with said pairs opposite each other on opposite sides of said reactor chamber.

7. A combined cycle power plant as recited in claim 1 further comprising ceramic filters mounted in a support structure within said pressure vessel, and having a dirty gas inlet, a clean gas outlet, and an ash outlet, said dirty gas inlet connected to said separator gas outlet.

8. A combined cycle power plant as recited in claim 7 wherein said at least one centrifugal separator is mounted along a side of said reactor chamber, connected to a side wall thereof, and wherein said support structure and said filters are mounted along the same side wall of said reactor chamber as said at least one separator, said filters extending generally horizontally.

9. A combined cycle power plant as recited in claim 7 wherein said at least one centrifugal separator is mounted along a side of said reactor chamber, connected to a side wall thereof, and wherein said gas outlet of said at least one separator is directed downwardly, and wherein said support structure and said filters are mounted to the same side wall of said reactor chamber as said separator, beneath said at least one separator, said filters extending generally horizontally.

10. A combined cycle power plant as recited in claim 1 wherein said means for conveying the pressurized gas comprises means for introducing oxygen containing gas under pressure at top of said vessel to pressurize the interior thereof, said pressurizing gas flow also comprising means for supplying fluidizing gas to said reactor chamber at the bottom thereof.

11. A combined cycle power plant as recited in claim 2 further comprising one or more generally identical separators; and wherein said reactor chamber has a first cross-sectional area, and wherein said least one separator is a plurality of separators, and each of said plurality of separators has a second cross-sectional area of the gas space thereof, and wherein said first cross-sectional area is substantially equal to the sums of said second cross-sectional areas.

12. A combined cycle power plant as recited in claim 5 wherein D is the internal diameter of said pressure vessel, d is the length of each side of each separator gas chamber, and L and w are the length and width of said reactor chamber and x is the number of separators; and wherein the optimized area of the reactor chamber for a particular diameter D of pressure vessel, is determined solving the equations $$\sqrt{\left(\left(\frac{L}{2}\right)^2 + \left(\frac{W}{2}\right)^2\right)} \leq \frac{D}{2}$$

$$\sqrt{\left(\left(\frac{w}{2}+d\right)^2 + 0.0625 x^2 d^2\right)} \leq \frac{D}{2}.$$

13. A combined cycle power plant as recited in claim 1 wherein said reactor chamber has a length and a width, and further comprising a plurality of heat transfer panels provided within said reactor chamber and extending along the length thereof.

14. A combined cycle power plant as recited in claim 13 wherein said at least one separator comprises at least two substantially identical separators mounted on opposite sides of said reactor chamber.

15. A combined cycle power plant as recited in claim 1 further comprising:
a heat recovery unit having an inlet in communication with a gas exhaust of the gas turbine means for recovering heat from gas discharged from the gas turbine and a recovery unit outlet in communication with an inlet to the heat exchanger chamber or the reactor chamber, and
a steam turbine with a turbine inlet coupled to an outlet to the bubbling fluidized bed heat exchanger chamber or an outlet to the reactor chamber.

16. A combined cycle power plant as recited in claim 15 wherein said common wall sections of the bubbling bed fluidized bed heat exchanger chamber, the reactor chamber and the vortex chamber each further comprises steam generation surfaces in communication with the steam turbine.

17. A combined cycle power plant as recited in claim 16 wherein said bubbling fluidized bed heat exchanger chamber includes steam reheating surfaces in communication with an outlet to the steam turbine.

18. A combined cycle power plant as recited in claim 16 wherein said reactor chamber includes steam reheating surfaces in communication with an outlet to the steam turbine.

19. A combined cycle power plant as recited in claim 1 wherein said centrifugal separator having a first cross-sectional area, and said bubbling fluidized bed heat exchanger chamber having a second cross-sectional area, the second cross-sectional area being smaller than or equal to the first cross-sectional area.

20. A combined cycle power plant as recited in claim 15 wherein said heat exchanger chamber operates as a supercritical or ultra-supercritical once-through steam cycle providing steam to the steam turbine.

21. Combined cycle power plant comprising:
an air compressor providing pressurized air at pressure greater than 2 bar;
a gas turbine means for driving the gas compressor means;
a pressure vessel, circular in cross-section, connected to said air compressor and being capable of withstanding pressures greater than 2 bar;
a pressurized circulating fluidized bed reactor enclosed by the pressure vessel, the circulating fluidized bed reactor having a reactor chamber, rectangular in cross-section, including substantially planar steam generation tube walls having a bottom section;
means for leading hot combustion gases away from said reactor;
a centrifugal separator disposed within said pressure vessel in communication with the reactor chamber for receiving and purifying hot combustion gases, having a gas outlet leading from said separator out of said pressure vessel;
said centrifugal separator comprising a vertical vortex chamber having distinctly planar steam generation tube walls defining an interior gas space; and
a bubbling fluidized bed heat exchanger chamber having distinctly planar steam generation tube walls defining an interior of said chamber, said chamber being connected to the bottom section of said reactor chamber;
a heat recovery unit in communication with the gas turbine means for recovering heat from gas discharged therefrom;
a steam generation cycle having a steam turbine, steam generation surfaces including said steam generation tube walls in the separator and heat exchanger chamber, and steam superheating surfaces.

22. Combined cycle power plant as recited in claim 21 wherein said heat exchanger chamber provides a supercritical or ultra-supercritical once-through steam cycle feeding steam to the gas turbine.

23. Combined cycle power plant comprising:
a gas compressor means for providing pressurized gas at pressure greater than 2 bar;
a gas turbine means for driving the gas compressor means;
a pressure vessel, circular in cross-section, and capable of withstanding pressures greater than 2 bar, and having a top and a bottom section;
a pressurized circulating fluidized bed reactor enclosed by the pressure vessel, the circulating fluidized bed reactor having a reactor chamber including substantially planar walls;
means for conveying the pressurized gas from said gas compressor means into said pressure vessel;
means for feeding fuel into said reactor chamber;
means for leading hot combustion gases away from said reactor;
at least one centrifugal separator disposed within said pressure vessel, and having an inlet connected to said means for leading hot combustion gases away from said reactor chamber, a gas outlet leading from said at least one separator out of said pressure vessel to the gas turbine means for expansion therein, and a return duct for recirculating separated solid particles from said separator to said reactor chamber;
said at least one centrifugal separator comprising a vertical vortex chamber having distinctly planar walls defining an interior gas space, said gas space having a cross section that is distinctly non-circular, having a circularity greater than or equal to 1.15; and a bubbling fluidized bed heat exchanger chamber disposed in the pressure vessel and in communication with said reactor chamber, said fluidized bed heat exchanger chamber sharing a common wall section with a first substantially planar wall of the reactor chamber, wherein the heat exchanger chamber is arranged within the reactor chamber, and the exchanger chamber has a second wall common to a second substantially planar side wall of the vertical vortex chamber and a third wall common to a third substantially planar side wall of the vertical vortex chamber.

24. A combined cycle power plant as recited in claim 23 wherein said gas space has a quadrate cross section, the at least one centrifugal separator has substantially flat water tube panels at an outer periphery of the separator.

25. A combined cycle power plant as recited in claim 23 further comprising ceramic filters mounted in a support structure within said pressure vessel, and having a dirty gas inlet, a clean gas outlet, and an ash outlet, said dirty gas inlet connected to said separator as outlet.

26. A combined cycle power plant as recited in claim 25 wherein said at least one centrifugal separator is mounted along a side of said reactor chamber, connected to a side wall thereof, and wherein said support structure and said filters are mounted along the same side wall of said reactor chamber as said at least one separator, said filters extending generally horizontally.

27. A combined cycle power plant as recited in claim 25 wherein said at least one centrifugal separator is mounted along a side of said reactor chamber, connected to a side wall thereof, and wherein said gas outlet of said at least one separator is directed downwardly, and wherein said support structure and said filters are mounted to the same side wall of said reactor chamber as said separator, beneath said at least one separator, said filters extending generally horizontally.

28. A combined cycle power plant as recited in claim 23 wherein said bubbling fluidized bed heat exchanger chamber includes steam reheating surfaces.

29. A combined cycle power plant as recited in claim 23 wherein said heat exchanger chamber provides a supercritical or ultra-supercritical once-through steam cycle.

* * * * *